Patented Mar. 11, 1930

1,750,540

UNITED STATES PATENT OFFICE

UGO PESTALOZZA, OF MILAN, ITALY, ASSIGNOR TO SOCIETÁ ITALIANA PIRELLI, OF MILAN, ITALY

MANUFACTURE OF RUBBER

No Drawing. Application filed March 9, 1929, Serial No. 345.901, and in Italy March 13, 1928.

This invention concerns the manufacture of rubber articles from latex, and is an improvement in and modification of the invention forming the subject of the application for U. S. A. Letters Patent Serial No. 204,421, now Patent No. 1,717,248, issued on June 11, 1929.

In brief, the improved manufacture of rubber articles according to the aforesaid patent consists in adding to rubber latex a coagulant of such type that in suitably small proportions produces at the temperature of addition at the most a decrease in fluidity and not coagulation, but on appropriate application of heat causes a more or less rapid thickening of the latex followed by coagulation. The latex so treated is then subjected to local heating to the temperature of forming the articles at the surface or surfaces at which the rubber is to be formed, so as there to produce a local thickening of the latex and the formation therefrom of a layer of compact coagulated rubber.

Thus, the said invention comprises the manufacture of rubber articles by internal or external moulding by putting in contact with latex containing a suitable proportion as aforesaid of a coagulant of the type described a heated mould or former of the shape and size of the desired article and heated to the forming-temperature, so as to produce at the surface of said mould or former a local thickening of the latex and the formation therefrom upon said surface of a layer of compact coagulated rubber.

By "forming-temperature" is meant the temperature of forming or moulding the article, and "forming" includes moulding.

Operating in the said manner, articles of coherent rubber may be rapidly produced the thickness of the rubber being determined by the time and the degree of heating.

The latex may be natural latex, but is preferably preserved for example, with ammonia; and may be of the original content in rubber or concentrated, provided that in the latter state it is sufficiently stable in presence of the coagulant as only to undergo increased thickening preliminary to coagulation where lo- cally raised to the desired forming-temperature.

Suitable coagulants of the type defined include organic and inorganic substances and among the latter described in said patent are salts of di- and tri-valent bases, especially salts of alkaline earth metals. Among the organic compounds which possess the said property are aromatic disubstituted guanidines and these may be advantageously applied for the purpose of promoting local thickening and coagulation under heat in the process aforesaid.

According to the present invention, therefore, the manufacture of rubber articles according to the process of the said Patent No. 1,717,248 is characterized by adding to latex a suitable proportion of an aromatic disubstituted guanidine, that is to say, such proportion of aromatic disubstituted guanidine as will at the temperature of addition, for example, the ordinary temperature, cause at the most a decrease in fluidity of the latex without coagulation, but an appropriate rise of temperature will promote a more or less rapid thickening followed by coagulation, and then locally heating the latex to the temperature of forming the article at the surface whereat the rubber is to be formed so as there to produce a local thickening of the latex and the formation therefrom of a layer of compact coagulated rubber.

The aromatic disubstituted guanidine may be, for example, a symm.-diphenylguanidine such as symm.-diphenylguanidine itself, or a substituted symm.-diphenylguanidine such as symm.-phenyl-o-tolylguanidine or symm.-di-o-tolylguanidine.

These substituted guanidines added to the latex, which may be concentrated or of its natural rubber content, in, for example, a proportion of substantially 0.5–2.5 per cent, leave the latex, even in absence of other substances. sufficiently fluid at ordinary temperatures, but render it capable of thickening and coagulation in those regions where localized heating, for instance, to a temperature between substantially 70°–95° C., is applied, there giving rise to a deposit of rubber of the desired shape and size in the manner described in the specification of the said Letters Patent. The guanidine derivative may be conveniently added in the form of a suspension in a few cc. of water.

The guanidine derivatives employed according to the present invention are known in the rubber industry as accelerators of vulcanization; but it will be appreciated that they are here used in a special manner in virtue of a newly discovered property which has no relationship with the property of accelerating vulcanization and which is applied in the invention to produce a particular and totally different technical effect. As a matter of fact, other known organic accelerators do not possess the requisite property of promoting thickening and coagulation under the conditions described. Thus, the substituted thioureas, thiuran disulphides, condensation products of aromatic amines and aldehydes, substituted benzothiazoles etc. have been found without effect in the direction in question, while certain other accelerators, such as substituted biguanides, cause a total coagulation of the latex even at ordinary temperature.

It must further be appreciated that the property of promoting thickening and coagulation of latex under suitable conditions for forming which is possessed by these aromatic disubstituted guanidines and which is applied in this invention becomes manifest in the absence of sulphur or other vulcanizing agent, and is utilizable for the manufacture of rubber articles which do not undergo the vulcanizing process.

It is to be noted that the rubber layer or rubber articles is always obtained from latex in the unvulcanized state, and may if desired be separately vulcanized in the ordinary way.

On the other hand, the property of accelerating vulcanization possessed by the said guanidine derivatives confers an additional advantage upon the invention, when the articles manufactured thereunder are vulcanized. In such case, the sulphur or other vulcanizing agent or agents may be added to the latex before the thickening and coagulation thereof.

The invention may be carried into effect in the same manner and with like variation as described in Patent No. 1,717,248. Thus, the article may be produced by internal or external moulding, or by extrusion as described in the said prior specification. As therein, "forming-temperature" means in this specification and claims the temperature at which local thickening and coagulation is produced and at which the article is formed or moulded. Both processes possess the advantage that, if desired, with but a single immersion, contact or passage, a rubber coat or article of any thickness can be obtained.

The presence of small quantities of other substances, such as ammonia or salts of alkaline-earth metals or other bi- or tri-valent metals, may serve to render the process of thickening and coagulation under heat more rapid; but such additions are not essential, for this change takes place in the presence alone of diphenyl-guanidine or its analogues, and even oxide of zinc in small quantity is not necessary.

The word "latex" as employed herein and in the claims is to be understood to mean any natural latex from caoutchouc-bearing plants. As already indicated, it may be of natural or raised concentration; and then may be added, according to necessity or desire, anticoagulants in the requisite quantity, and sulphur or the other various substances which are used as ingredients or fillers in the rubber industry.

Having now particularly described and ascertained the nature of my invention and in what manner the same is to be performed I declare that what I claim is:

1. The process of manufacture of rubber articles from latex which comprises adding to the latex a suitable proportion of an aromatic disubstituted guanidine and then subjecting the latex to local heating to the forming temperature at the surface whereat the rubber is to be formed so as there to produce a local thickening of the latex and the formation therefrom at said surface of a layer of compact coagulated rubber.

2. The process of manufacture of rubber articles from latex which comprises adding to the latex a suitable proportion of an aromatic disubstituted guanidine and then subjecting the latex to local heating to the forming temperature at the surface whereat the rubber is to be formed so as there to produce a local thickening of the latex and the formation therefrom at said surface of a layer of compact coagulated rubber and vulcanizing the rubber.

3. The process of manufacture of rubber articles from latex which comprises adding to the latex between substantially 0.5–2.5 per cent of an aromatic disubstituted guanidine and then subjecting the latex to local heating to the forming temperature at the surface whereat the rubber is to be formed so as there to produce a local thickening of the latex and the formation therefrom at said surface of a layer of compact coagulated rubber.

4. The process of manufacture of rubber articles from latex which comprises adding to the latex between substantially 0.5–2.5 per cent of an aromatic disubstituted guanidine and then subjecting the latex to local heating to between substantially 70°–95° C. at the surface whereat the rubber is to be formed so as there to produce a local thickening of the latex and the formation therefrom at said surface of a layer of compact coagulated rubber.

5. The process of manufacture of rubber-articles from latex which comprises adding to the latex a suitable proportion of an aromatic disubstituted guanidine and then putting in contact with the latex a heated former of the shape and size to give the article desired heated to such a temperature as to produce at the surface of said former a local thickening of the latex and the formation therefrom upon said surface of a layer of compact coagulated rubber.

6. The process of manufacture of rubber articles from latex which comprises adding to the latex between substantially 0.5–2.5 per cent of an aromatic disubstituted guanidine and then putting in contact with the latex a heated former of the shape and size to give the article desired heated to such a temperature as to produce at the surface of said former a local thickening of the latex and the formation therefrom upon said surface of a layer of compact coagulated rubber.

7. The process of manufacture of rubber articles from latex which comprises adding to the latex between substantially 0.5–2.5 per cent of an aromatic disubstituted guanidine and then putting in contact with the latex a heated former of the shape and size to give the article desired heated to between substantially 70° C.–95° C. so as to produce at the surface of said former a local thickening of the latex and the formation therefrom upon said surface of a layer of compact coagulated rubber.

8. The process of manufacture of rubber articles from latex which comprises adding to the latex a suitable proportion of a symmetrical diphenyl-guanidine and then putting in contact with the latex a heated former of the shape and size to give the article desired heated to such a temperature as to produce at the surface of said former a local thickening of the latex and the formation therefrom upon said surface of a layer of compact coagulated rubber.

9. The process of manufacture of rubber articles from latex which comprises adding to the latex between substantially 0.5–2.5 per cent of a symmetrical diphenyl-guanidine and then putting in contact with the latex a heated former of the shape and size to give the article desired heated to between substantially 70°–95° C. so as to produce at the surface of said former a local thickening of the latex and the formation therefrom upon said surface of a layer of compact coagulated rubber.

10. The process of manufacture of rubber articles from latex which comprises adding to the latex between substantially 0.5–2.5 per cent of a symmetrical diphenyl-guanidine and then putting in contact with the latex a heated former of the shape and size to give the article desired heated to between substantially 70°–95° C. so as to produce at the surface of said former a local thickening of the latex and the formation therefrom upon said surface of a layer of compact coagulated rubber, and vulcanizing the rubber.

11. The process of manufacture of rubber articles from latex which comprises adding to the latex a suitable proportion of the aromatic disubstituted guanidine together with another substance accelerative under heat of thickening and coagulation of the latex and then putting in contact with the latex a heated former of the shape and size to give the article desired heated to such a temperature as to produce at the surface of said former a local thickening of the latex and the formation therefrom upon said surface of a layer of compact coagulated rubber.

12. The process of manufacture of rubber articles from latex which comprises adding to the latex a suitable proportion of an aromatic disubstituted guanidine together with a salt of an alkaline earth and then putting in contact with the latex a heated former of the shape and size to give the article desired heated to such a temperature as to produce at the surface of said former a local thickening of the latex and the formation therefrom upon said surface of a layer of compact coagulated rubber.

In testimony whereof I affix my signature.

UGO PESTALOZZA.